US010877675B2

(12) United States Patent
Mukherjee et al.

(10) Patent No.: US 10,877,675 B2
(45) Date of Patent: Dec. 29, 2020

(54) LOCKING BASED ON CATEGORICAL MEMORY ALLOCATION

(71) Applicant: SAP SE, Walldorf (DE)

(72) Inventors: Anupam Mukherjee, Dublin, CA (US); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/277,250

(22) Filed: Feb. 15, 2019

(65) Prior Publication Data

US 2020/0264786 A1 Aug. 20, 2020

(51) Int. Cl.
*G06F 16/22* (2019.01)
*G06F 3/06* (2006.01)

(52) U.S. Cl.
CPC .......... *G06F 3/0631* (2013.01); *G06F 3/0611* (2013.01); *G06F 3/0644* (2013.01); *G06F 3/0685* (2013.01); *G06F 16/2282* (2019.01)

(58) Field of Classification Search
CPC .................................................. G06F 16/2282
See application file for complete search history.

(56) References Cited

U.S. PATENT DOCUMENTS

| | | | | |
|---|---|---|---|---|
| 5,680,573 A | * | 10/1997 | Rubin | G06F 12/0866 |
| | | | | 711/129 |
| 2016/0171034 A1 | * | 6/2016 | Konik | G06F 16/116 |
| | | | | 707/803 |
| 2016/0350392 A1 | * | 12/2016 | Rice | G06F 16/27 |
| 2018/0074966 A1 | * | 3/2018 | Cheng | G06F 12/0866 |

OTHER PUBLICATIONS

European Search Report and Written Opinion dated Apr. 14, 2020 which was issued in a counterpart application EP 19215637.0.
Meyer et. al.: "Dynamic and Transparent Data Tiering for In-Memory Databases in Mixed Workload Environments" Very Large Database Conference 2015, Aug. 31-Sep. 4, 2015, Hawaii; Aug. 31, 2015 pp. 37-48.

* cited by examiner

*Primary Examiner* — Edward J Dudek, Jr.
(74) *Attorney, Agent, or Firm* — Buckley, Maschoff & Talwalkar LLC (57) ABSTRACT

Provided is a system and method for improving memory management in a database. In one example, the method may include receiving a request to store a data object within a database, determining a category type associated with the data object from among a plurality of category types based on an attribute of the data object, and storing the data object via a memory pool corresponding to the determined category from among a plurality of memory pools corresponding to the plurality of respective categories, where the storing comprises allocating a first category type of data object to a first memory pool locked to main memory and allocating a second category type of data object to a second memory pool that is swapped out to disk over time. The locked memory pool can ensure that more important data items remain available even when they are the least recently used.

20 Claims, 7 Drawing Sheets

LOCKING BASED ON CATEGORICAL MEMORY ALLOCATION

BACKGROUND

An in-memory database (e.g., main memory database, etc.) is a database management system that relies on main memory (e.g., random access memory, etc.) for computer data storage, as opposed to relying solely on hard disk. An in-memory database may seldom or never go to disk when the database has large memory banks and the data sets are reasonably sized. However, for larger data sets, the in-memory storage can become full requiring data to be swapped to disk. Typically, databases swap out pages of data via a least recently used (LRU) model which considers the amount of time that has gone by since the data was last accessed. In this scenario, the data that is least recently used (i.e., the oldest data) is swapped to disk. However, the LRU model does not consider the type of data being swapped to disk. Therefore, the overall performance of the database can be degraded when important data is swapped out which requires it to be loaded from disk during a subsequent use. Accordingly, an improved mechanism for determining which data to swap out is needed.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Memory management controls how memory resources of a computer or a virtual machine are shared. For databases, memory management is performed by the operating system. When the database runs out of the main memory (i.e., random access memory), the operating system may move pages of memory over to hard disk to free up main memory for storage of data from other processes. The moving of data is referred to as a memory swap. Too much reliance on swapping memory to disk can impair performance of the database because main memory (e.g., RAM) operates much faster than disk memory. In particular, the operating system must wait for the disk to catch up when a page is swapped. Also, the more a workload relies on swapped files, the more it negatively impacts the performance.

In situations of high memory contention within a database, pages of data from the main memory are typically swapped to disk based upon previous usage patterns such as the least recently used model. In some cases, this level of sophistication may be enough. However, for system software such as in-memory databases, swapping out data that is used more often can result in significant deterioration in performance. For example, a data object stored in main memory may be the least recently used data object, and therefore subject to swap even when another data object that is used significantly less often is more recently used. However, a traditional database is unable to differentiate between the importance in availability between two data objects. Instead, the traditional database swaps out the least recently used regardless of its importance to the overall system.

Most data structures including database tables are comprised of different categories of memory. For example, data may include multiversion currency control (MVCC) data, delta differential (delta) data, dictionary data, index data, main data, and the like. The example embodiments implement data categorization in combination with a memory locking scheme to pin more important categories of data within the main memory, while allowing less important data categories to be swapped to disk or another intermediate form of memory such as solid-state disk (SSD), non-volatile memory express (NVMe), and the like. That is, rather than swap out the least recently used page from main memory, the database operating system may lock certain categories of data within the main memory to prevent these categories of data from being swapped out. As an example, categories of data that can be include data that is needed on a more frequent basis such as MVCC data, delta data, and the like. These data types can be learned by the database over time and can vary from system to system. By categorizing data into tiers of importance and swapping based on the tiers, the overall performance of the memory management by the operating system can be significantly improved.

Figure 1A:
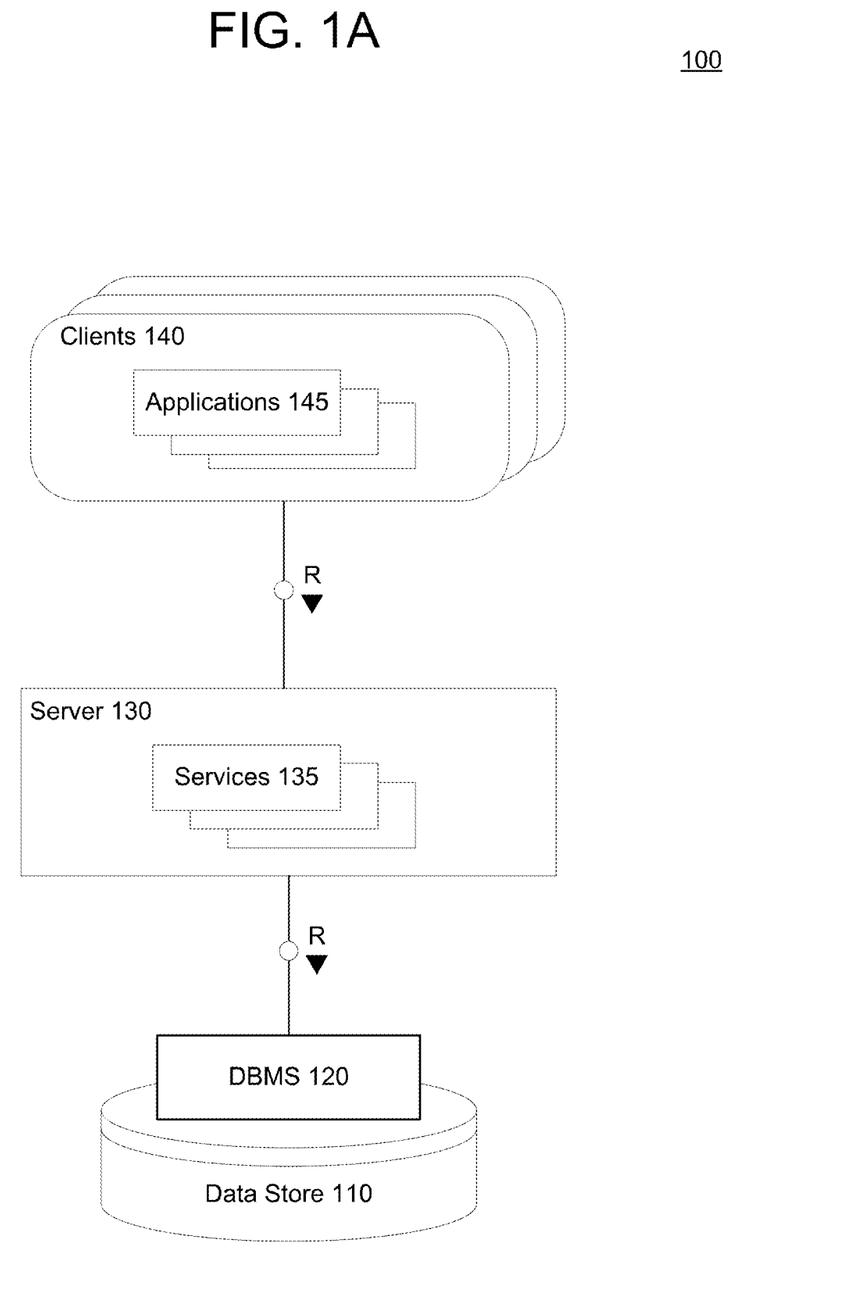
FIG. 1A is a diagram illustrating a database system architecture in accordance with an example embodiment.

FIG. 1A illustrates a system architecture of a database 100 in accordance with an example embodiment. It should be appreciated that the embodiments are not limited to architecture 100 or to a database architecture, however, FIG. 1A is shown for purposes of example. Referring to FIG. 1A, the architecture 100 includes a data store 110, a database management system (DBMS) 120, a server 130, services 135, clients 140, and applications 145. Generally, services 135 executing within server 130 receive requests from applications 145 executing on clients 140 and provides results to the applications 145 based on data stored within data store 110. For example, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one non-limiting example, a client 140 may execute an application 145 to perform visual analysis via a user interface displayed on the client 140 to view analytical information such as charts, graphs, tables, and the like, based on the underlying data stored in the data store 110. The application 145 may pass analytic information to one of services 135 based on input received via the client 140. A structured query language (SQL) script may be generated based on the request and forwarded to DBMS 120. DBMS 120 may execute the SQL script to return a result set based on data of data store 110, and the application 145 creates a report/visualization based on the result set. As another example, the analytic data may be input by the user and provided directly from the application 145 to the DBMS 120 or the data store 110.

According to various embodiments, an application 145 and/or a service 135 may be used to identify and combine features for training a machine learning model. Raw data from various sources may be stored in the data store 110. In this example, the application 145 and/or the service 135 may extract core features from the raw data and also derive features from the core features. The features may be stored as database tables within the data store 110. For example, a feature may be assigned to its own table with one or more columns of data. In one example, the features may be observed as numerical values. Furthermore, the application 145 and/or the service 135 may merge or otherwise combine features based on a vertical union function. In this example, the application 145 and/or the service 135 may combine features from a plurality of database tables into a single table which is then stored in the data store 110.

The services 135 executing on server 130 may communicate with DBMS 120 using database management interfaces such as, but not limited to, Open Database Connectivity (ODBC) and Java Database Connectivity (JDBC) interfaces. These types of services 135 may use SQL and SQL script to manage and query data stored in data store 110. The DBMS 120 serves requests to query, retrieve, create, modify (update), and/or delete data from database files stored in data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the database files stored in the data store 110. The application services can be used to expose the database data model, with its tables, views and database procedures, to clients 140. In addition to exposing the data model, server 130 may host system services such as a search service, and the like.

Data store 110 may be any query-responsive data source or sources that are or become known, including but not limited to a SQL relational database management system. Data store 110 may include or otherwise be associated with a relational database, a multi-dimensional database, an Extensible Markup Language (XML) document, or any other data storage system that stores structured and/or unstructured data. The data of data store 110 may be distributed among several relational databases, dimensional databases, and/or other data sources. Embodiments are not limited to any number or types of data sources.

In some embodiments, the data of data store 110 may include files having one or more of conventional tabular data, row-based data, column-based data, object-based data, and the like. According to various aspects, the files may be database tables storing data sets. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another. Furthermore, data store 110 may support multiple users that are associated with the same client and that share access to common database files stored in the data store 110.

According to various embodiments, data items (e.g., data records, data entries, etc.) may be stored, modified, deleted, and the like, within the data store 110. As an example, data items may be created, written, modified, or deleted based on instructions from any of the applications 145, the services 135, and the like. Each data item may be assigned a globally unique identifier (GUID) by an operating system, or other program of the database 100. The GUID is used to uniquely identify that data item from among all other data items stored within the database 100. GUIDs may be created in multiple ways including, but not limited to, random, time-based, hardware-based, content-based, a combination thereof, and the like.

The architecture 100 may include metadata defining objects which are mapped to logical entities of data store 110. The metadata may be stored in data store 110 and/or a separate repository (not shown). The metadata may include information regarding dimension names (e.g., country, year, product, etc.), dimension hierarchies (e.g., country, state, city, etc.), measure names (e.g., profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each of clients 140 may include one or more devices executing program code of an application 145 for presenting user interfaces to allow interaction with application server 130. The user interfaces of applications 145 may comprise user interfaces suited for reporting, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols.

One or more of clients 140 may also or alternatively present user interfaces by executing a standalone executable file (e.g., an .exe file) or code (e.g., a JAVA applet) within a virtual machine. Clients 140 may execute applications 145 which perform merge operations of underlying data files stored in data store 110. Furthermore, clients 140 may execute the conflict resolution methods and processes described herein to resolve data conflicts between different versions of a data file stored in the data store 110. A user interface may be used to display underlying data records, and the like.

Figure 1B:
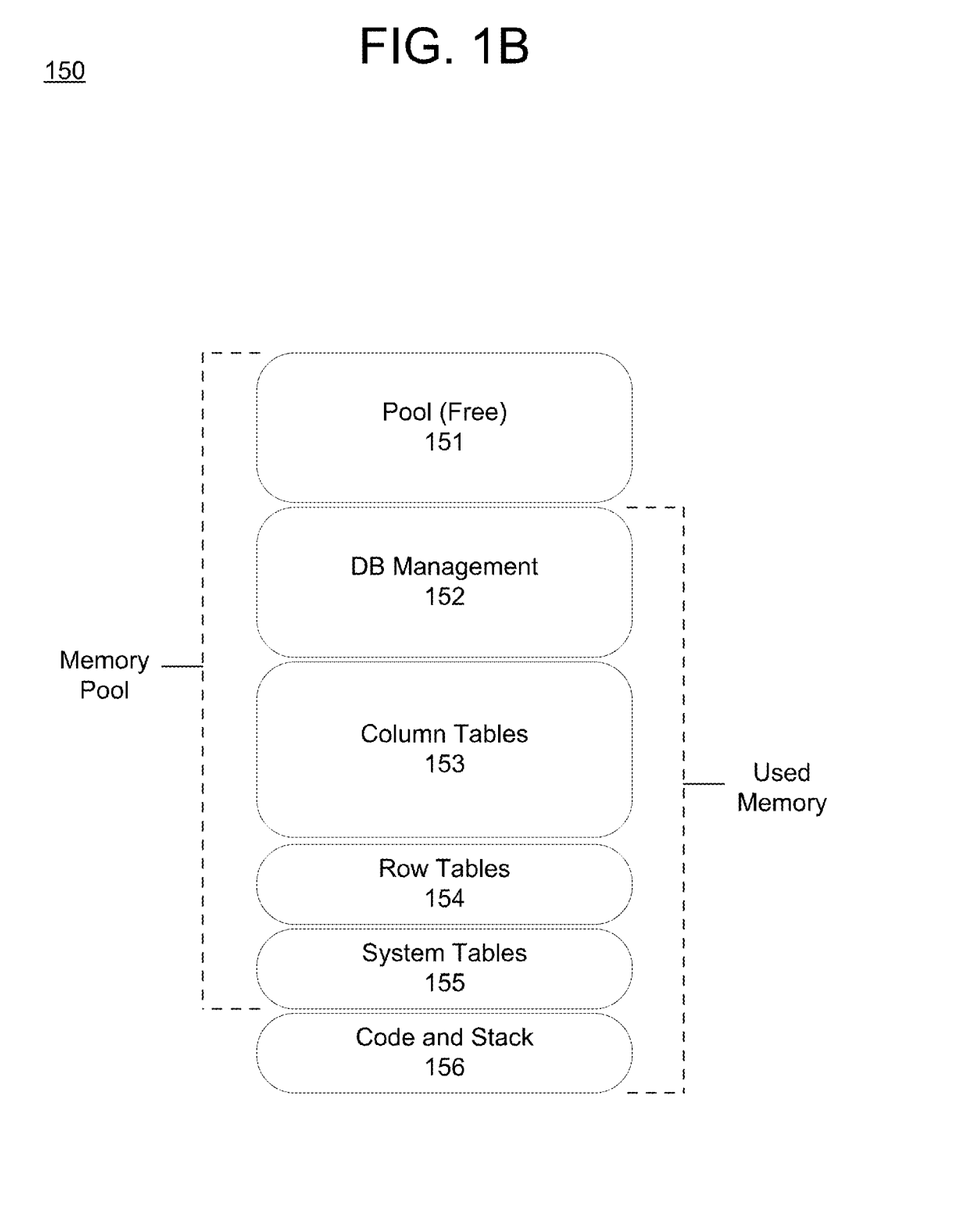
FIG. 1B is a diagram illustrating a memory system architecture for use with a database system in accordance with an example embodiment.

FIG. 1B illustrates a memory system architecture 150 for use with a database system in accordance with an example embodiment. As an example, the architecture 150 may represent the architecture of the data store 110 shown in FIG. 1A, however, the architecture 150 is not limited to implementation via the data store and may instead be another memory source or device included within a database such as an in-memory database. A database may allocate main memory in the form of memory pools. According to various embodiments, each memory pool may be associated with a different category of data. In the example of FIG. 1B, a memory pool includes a free pool 151, database management data 152, column tables 153, row tables 154, and system tables 155. The architecture 150 may also include code and stack 156 of a process which includes a copy of the program code and a copy of the process stack.

A database may include processes running in an operation environment. The operating system may be responsible for the reservation of memory to all processes. When the database starts up, the operating system may reserve memory for the program code (sometimes called the text), the program stack, and static data in code and stack 156. The operating system may dynamically reserve additional data memory when requested by the SAP HANA memory manager. Dynamically allocated memory includes heap memory and shared memory. An in-memory database may carefully manage and track its consumption of memory. For this purpose, the database may manage its own data memory pool by requesting memory from the operating system, possibly in advance of using it. The memory pool is used to store all the in-memory data and system tables, thread stacks, temporary computations and all the other data structures required for managing a database.

The column store is the part of the database that manages data organized in columns in memory. Tables created as column tables 153 are stored here. The memory architecture 150 also includes row tables 154 and system tables 155 for additional storage. A column store (which includes the column tables 154) may be optimized for read operations but also provides good performance for write operations. This may be achieved through two data structures including main storage and delta storage. The main storage contains the main part of the data. Here, efficient data compression is applied to save memory and speed up searches and calculations. However, write operations on compressed data in the main storage would be costly. Therefore, write operations may not directly modify compressed data in the main storage. Instead, all changes may be written to a separate data structure called the delta storage. The delta storage uses only basic compression and is optimized for write access. In this case, read operations may be performed on both structures (main and delta), while write operations only affect the delta storage. Changes collected in the delta storage may be moved to the read-optimized main storage via a process called delta merge.

The database may load column tables into main memory by column upon use which may be referred to as lazy loading. Columns that are never used may never be loaded to the main memory thereby avoiding waste. When more memory is required for table growth or temporary computations, the memory manager (operating system) may obtain additional memory from a memory pool 151. When the pool 151 cannot satisfy the request, the memory manager will increase the pool size by requesting more memory from the operating system, up to a predefined allocation limit. Memory is a finite resource.

Once the allocation limit has been reached and the pool exhausted, the memory manager must give up stored data to create allocable memory. In a related art, buffers and caches may be released and column store tables may be unloaded, column by column, based on a least-recently-used order. When tables are partitioned over several hosts, this is managed per host. However, the "least recently used" model does not account for what type of data is being swapped out. As a result, the database may suffer deterioration in the memory performance when certain types of data are swapped out.

Figure 2:
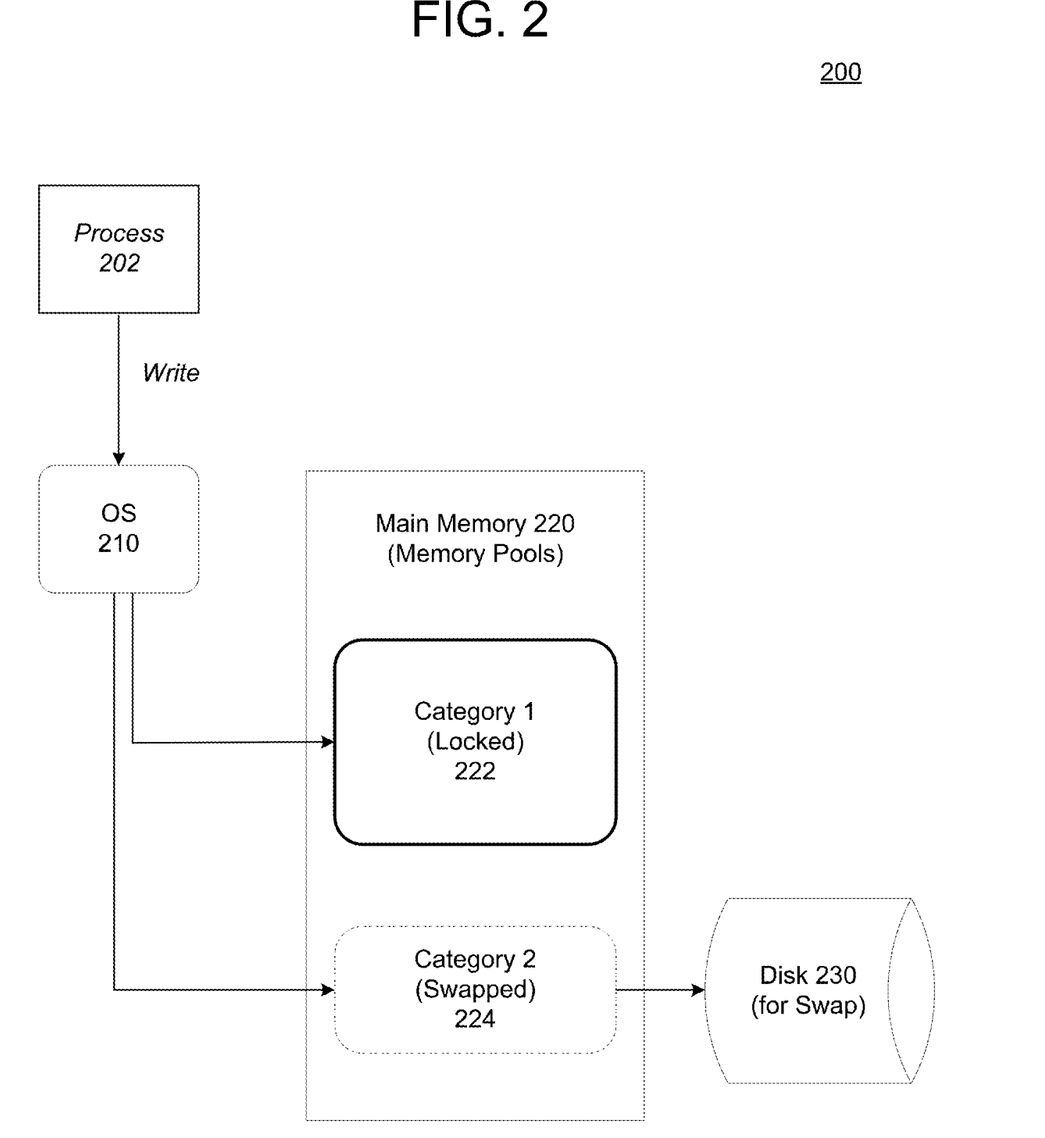
FIG. 2 is a diagram illustrating a multi-category in-memory architecture in accordance with an example embodiment.
Figure 3:
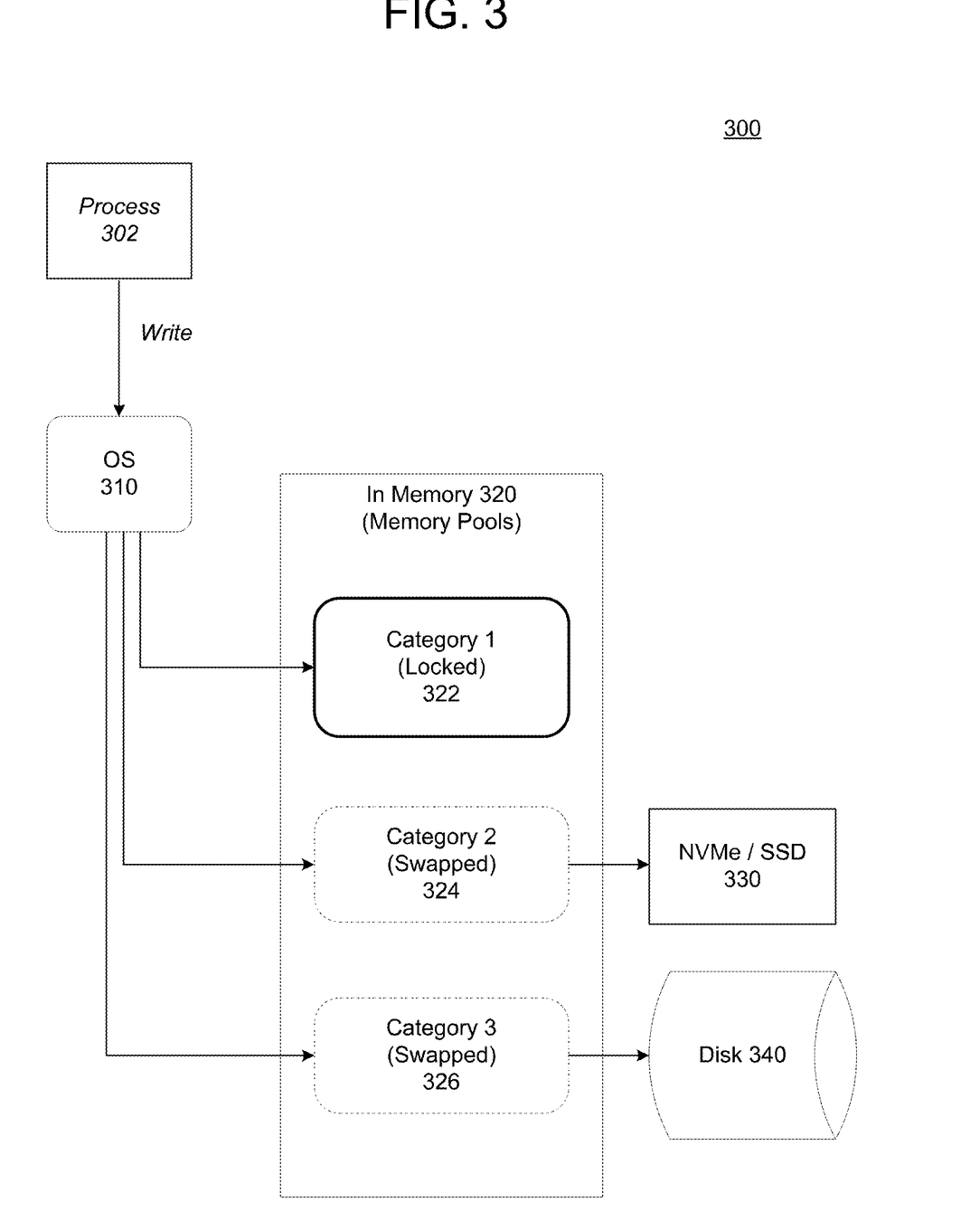
FIG. 3 is a diagram illustrating another example of a multi-category in-memory architecture in accordance with an example embodiment.

FIG. 2 illustrates a multi-category in-memory architecture 200 in accordance with an example embodiment, and FIG. 3 illustrates a multi-category in-memory architecture 300 in accordance with another example embodiment. Referring to FIG. 2, a process 202 such as a database application may query a piece of memory from a pool, via an operating system 210, and put a page in the called pool. The pool may correspond to a pool from among a plurality of pools which are stored within a main memory 220 of a database. Each pool may be associated with a different category of data. The different categorization may dictate whether the operating system swaps out the data to disk or whether the data is locked to physical main memory.

In the example of FIG. 2, the main memory 220 is illustrated with two memory pools 222 and 224 which correspond to two different categories of data. In this example, the first memory pool 222 corresponds to a first category of data and the second memory pool 224 corresponds to a second category of data. For example, data that is of greater importance to the performance of the memory, such as MVCC data, delta data, and the like, may be categorized in the first category, while the remaining data such as index data, dictionary data, main data, and the like, may be categorized in the second category. According to various embodiments, the operating system 210 may lock all data stored in the first memory pool 222 to physical memory of the main memory 220 meanwhile, the operating system 210 may swap out the least recently used data from the second memory pool 224 when the operating system 210 needs to make room in the main memory 220. To accommodate the locks for memory pool 222, the operating system 210 may allocate more physical memory to the first memory pool 222 than allocated to the second memory pool 224.

A database may inherently implement data pools for different types of data. For example, the database may have a separate memory pool(s) for delta data, a separate memory pool(s) for main data, and the like. The database may flag pools to indicate whether the pools should be locked to memory or whether the pools should be swapped out to disk. For example, the flag may include an identifier that labels the pool as locked, swapped, etc. In the example of FIG. 2, the first memory pool 222 (more important) may correspond to delta data pools, MVCC data, etc., while the second memory pool 224 (less important) may correspond to main data. MVCC data can be very important to a database because each query needs access to this (should be in fastest possible memory). Meanwhile, data captured from data monitoring may never be accessed again and does not need to be in a fastest memory regardless of whether it is the most recently used data stored in the memory.

What is considered "important" can be determined by a system administrator, default, etc., and it can be modified. MVCC data may include information which controls concurrent access to a database to provide point-in-time consistent views when multiple users are trying to view, read, write, etc., to the same data. MVCC data may be labeled assigned to the first memory pool 222. Delta data may include data stored in a delta differential which is capable of being written to as well as read in contrast to main data which can only be read. Delta data may be assigned to the first memory pool 222. Other types of data may also be assigned to the first memory pool 222, however, these two types are described for purposes of example. Meanwhile, other data types such as dictionary data, index data, cache data, buffer data, and the like, may be assigned to the second data pool 224. In some cases, data from a same query may be spread across different pools.

In the example of FIG. 2, data which is stored in the first memory pool 222 is locked to the main memory, while data stored in the second memory pool 224 may be swapped out to hard disk 230. Reading from the disk 230 and swapping data to the disk 230 may happen almost continuously in a contentious memory. Very frequently data may be going to the disk 230 and coming back from the disk 230. Accessing the disk 230, however, is orders of magnitude slower than access data that is stored in main memory 220. Therefore, when the operating system 210 access data from the disk 230, it will store the data in one of the memory pools which are categorized into first pool 222 and second pool 224. Then, when the operating system 210 needs to make room in main memory 220, it will take data from the second pool 224 rather than the first pool 222 regardless of whether the data in the first pool 222 is data that is least frequently used. In other words, the operating system 210 will be prevented from scheduling out the data stored in the first pool 222.

Switching out data from a main memory of a database is typically done based on a LRU (least recently used) algorithm. As a result, the data items that are the oldest are swapped out of the main memory when memory space has filled up and the operating system needs room for new items. However, this scheme (LRU) does not consider the contents of what is being swapped out but instead simply considers a storage/access time of the data. However, most databases already assign data types to different memory pools. The example embodiments leverage these data pools by labelling them as locked or swapped thereby categorizing pools of memory as more important and less important. Based upon how many categorizes of memory the database can have a corresponding number of memory pools.

In highly contentious situations, the database needs to make judicious use of memory. With memory allocations into the right pools, the system can achieve overall performance gain by better memory speed/performance. The cause of the gain is that the pages being swapped out are only those pages with content that the system has learned are least used, even though they may not be the most recently used in the main memory. The database can ensure that the most important data items stay in the highest performing memory (main memory). What is most important may be determined from experience of how often memory is accessed. Some memory is always accessed such as MVCC memory, Delta memory, etc. However, main memory related stuff is not critical and can be swapped. Oftentimes, stuff that is pushed into main memory for the first time is never accessed again. Therefore, it does not need to be held in the main memory even when it is one of the younger data pages.

The categorization is also extensible. In the example of FIG. 2, there are two categories of data and corresponding memory pools, however, in FIG. 3 there are three categories of data and three corresponding memory pools. It should also be appreciated that more than three categories of memory pools could be used. In the example of FIG. 3, a first memory pool 322 remains locked within main memory 320 while a second memory pool 324 and a third memory pool 326 are swapped out. In this example, part of the swap space (memory pool 326) is backed by hard disk 340 while an intermediate tier of data (memory 324) is backed by a storage that is faster than hard disk such as a solid-state disk (SSD), a non-volatile memory express (NMVe), and the like. Here, a flag can be attached to each pool to identify whether the pool is to be swapped out to disk, swapped out to SSD/NVMe, or locked in main memory.

Database software may have a detailed level of knowledge about the relative importance of different pieces of memory. For example, database software may be developed such that it is aware that the cost of Delta or MVCC related memory moving to swap and hitting a page fault is much higher than the cost of main related memory being swapped. Most database software has moved to the use of memory pools in which related memory is allocated from the relevant memory pool. As an example, main data may be allocated to a main memory pool, MVCC data may be allocated to a MVCC data pool, and delta data may be allocated to a delta memory pool. In this example, the database may use a tagging mechanism to mark the MVCC and delta data pools as Tier 1 (locked to main memory) and mark main data pool(s) as Tier 2 (swappable to disk, etc.) This allows the database to allocate mlocked memory for highly contentious delta and MVCC data structures while main memory is allocated from regular swap backed memory. In high memory contention cases this leads to a more efficient use of valuable and limited memory resources than with the Linux memory governor. This idea is easily extendible to more than two Tiers of memory and memory pools (such as the example shown in FIG. 4). The system can be used alone or in conjunction with a buffer manager to make the most efficient use of various tiers of memory thus, providing a better TCO than the default case.

Figure 4:
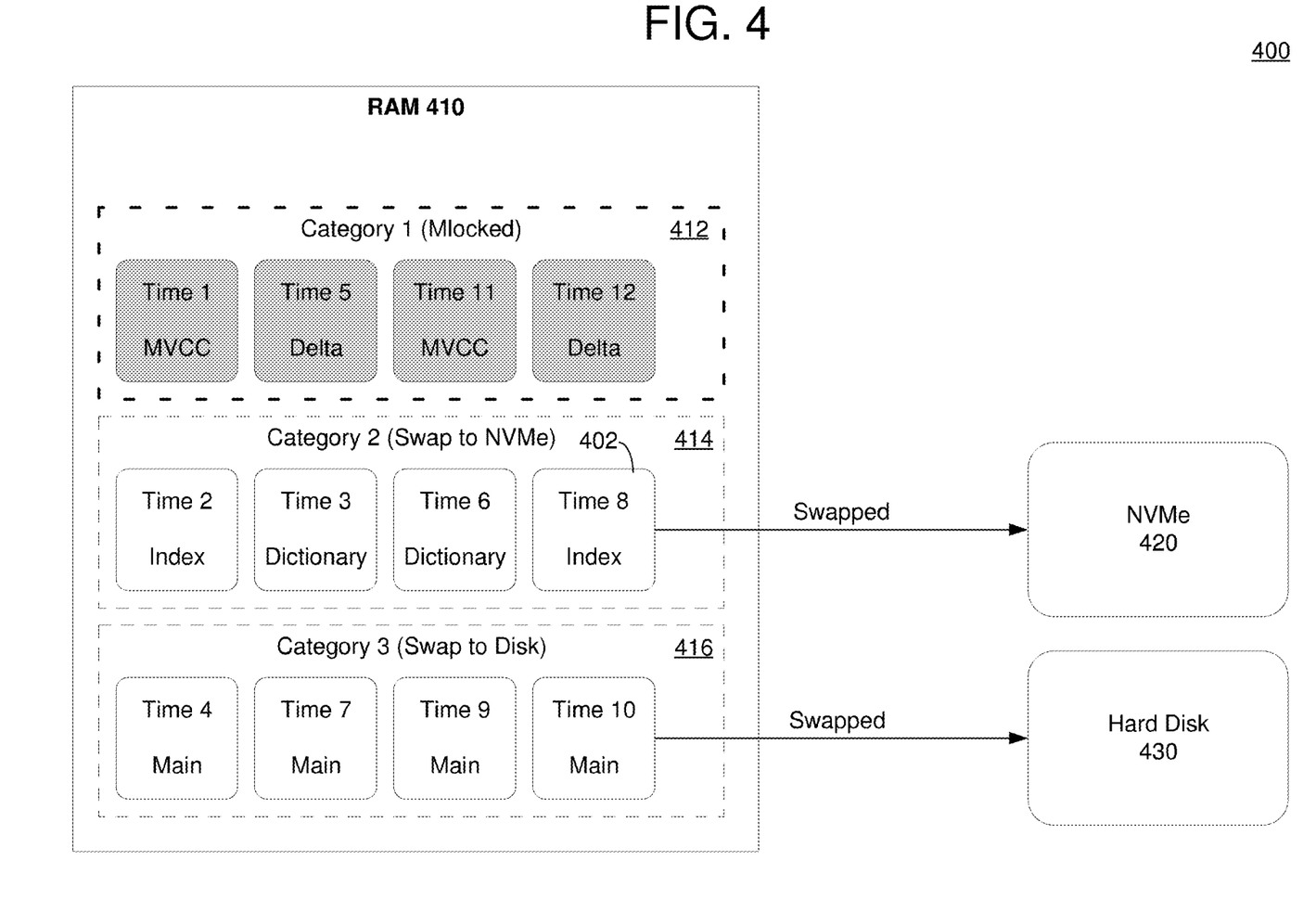
FIG. 4 is a diagram illustrating of a process of swapping data out of an in-memory architecture in accordance with an example embodiment.

FIG. 4 illustrates a process 400 of swapping data out of an in-memory architecture in accordance with an example embodiment. Referring to FIG. 4, a main memory 410 includes three memory pools 412, 414, and 416 which have been flagged with three different locking and swapping parameters. In particular, memory pool 412 is locked to physical memory of the main memory 410. In addition, memory pool 414 is flagged such that it is swapped to an intermediate speed memory such as SSD or NVMe 420. Furthermore, the memory pool 416 is flagged such that it is swapped to disk 430.

In this example, the operating system may set a priority of swap between the data from the memory pool 414 and the data from the memory pool 416. For example, the data from memory pool 414 may be swapped out from main memory 410 first, because it is swapped to a faster memory (NVMe 420) than the disk 430. When the operating system has filled the NVMe 420, the operating system may then swap to disk 430 from the memory pool 416.

In the example of FIG. 4, the least recently used data object (e.g., page, block, table, etc.) is labeled as Time 12, while the most recently used data object is labeled as Time 1. That is, the order of use of the data objects is sequentially listed between Time 1 to Time 12 with Time 12 being the least recently used. In a traditional database system, the operating system would swap the least recently used data object (Time 12). However, in this example, the data object for Time 12 is a delta data object that is stored within memory pool 412 locked to physical memory. Therefore, the data object (Time 12) is not swapped. The same goes for data object (time 11) which is also locked to main memory because it is stored in memory pool 412.

Both memory pool 414 and memory pool 416 may be swapped out in any order. For example, the operating system may swap out data from memory pool 414 first or from memory pool 416 first. In this example, the operating system may swap out data object (Time 10) from memory pool 416 which is the least recently used data object among the memory pools 414 and 416, then the operating system may swap out data object 402 (Time 8) from the memory pool 414 to NVMe 420, however, embodiments are not limited thereto. The operating system may continue to make room for the main memory 410 by swapping out data objects from memory pool 414 to the NVMe 420 and memory pool 416 to disk 430.

Figure 5:
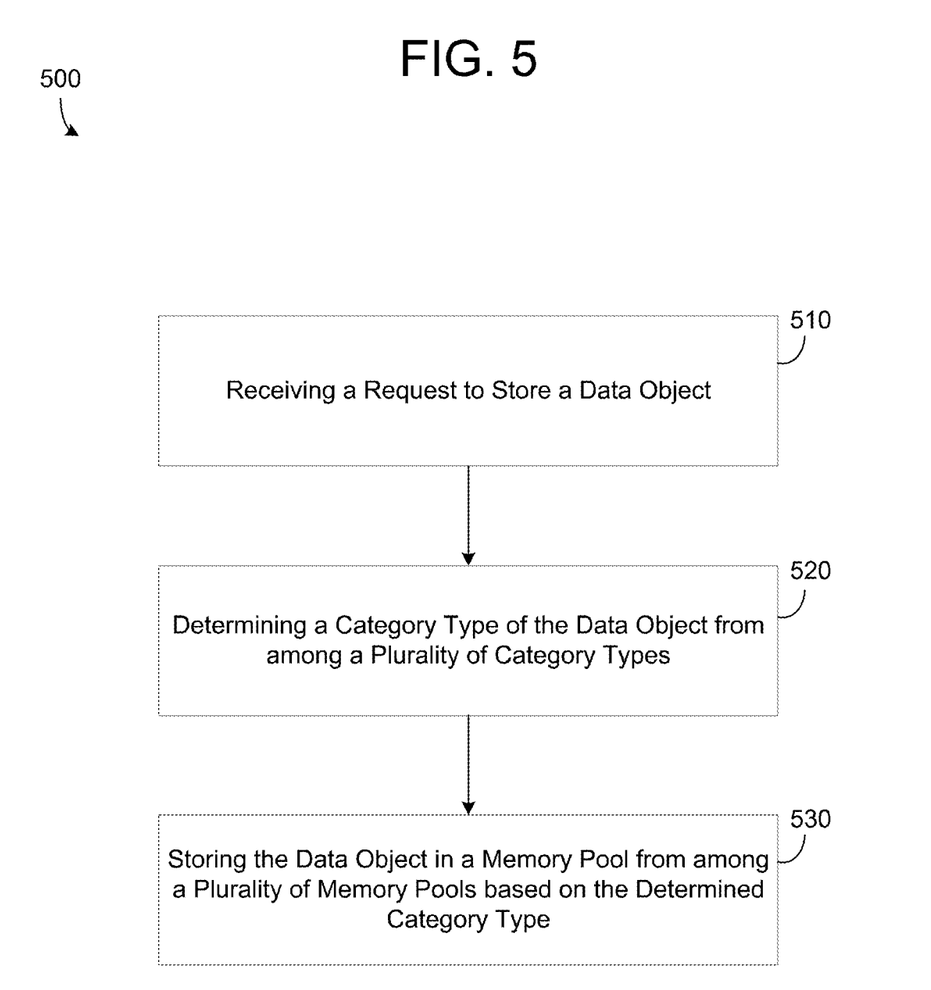
FIG. 5 is a diagram illustrating a method of allocating data to memory based on a category of the data in accordance with an example embodiment.

FIG. 5 illustrates a method 500 of allocating data to memory based on a category of the data in accordance with an example embodiment. For example, the method 500 may be performed by a database node, a cloud platform, a server, a computing system (user device), a combination of devices/nodes, or the like. Referring to FIG. 5, in 510, the method may include receiving a request to store a data object within a database. For example, the data object may include a page, a block, a table, or the like. The request may be received from a process, an application, an operating system, and the like.

In 520, the method may include determining a category type associated with the data object from among a plurality of category types based on an attribute of the data object. Furthermore, in 530 the method may include storing the data object via a memory pool corresponding to the determined category from among a plurality of memory pools corresponding to the plurality of respective categories. According to various embodiments, the main memory may include a plurality of memory pools that are associated with a plurality of different lock or swap features. For example, one memory pool (and data categorized therein) may be locked to main memory, while at least one other memory pool (and data categorized therein) may be swapped to disk when main memory space is needed. In this example, the method may include allocating a first category type of data object to a first memory pool locked to main memory and allocating a second category type of data object to a second memory pool that is swapped out to disk over time.

In some embodiments, the determining may include determining the category type of the data object is the first category type in response to the data object being associated with multiversion concurrency control (MVCC) data, differential buffer data, and the like. In some embodiments, the determining may include determining the category type of the data object is the second category type in response to the data object comprising data from disk. Here, the data of the second category type may include dictionary data, cache data, buffer data, index data, column store data, row store data, system data, and the like. Furthermore, when main memory space is needed, the method may further include swapping out a data object from the second memory pool to the disk while keeping other data objects in the first memory pool even though the data objects in the first memory pool are least recently used with respect to the data object from the second memory pool. For example, the first memory pool may be pinned to physical memory and data in the second memory pool may be managed with virtual memory that is backed by less physical memory than the first memory pool.

In the examples described, the plurality of categories may correspond to a plurality of levels of importance in availability to the database. These categories may be determined by a system operator, by default, or the like. Memory pools are naturally created for various types of data such as delta data, main data, and the like. The database may flag these memory pools to indicate whether the data stored in the memory pools should be swapped to disk or locked to main memory without being swapped out. In some embodiments, the categories may include at least a third category which is allocated to a third memory pool which is swapped out to one or more of a non-volatile memory express (NMVe) and a solid-state disk (SSD).

Figure 6:
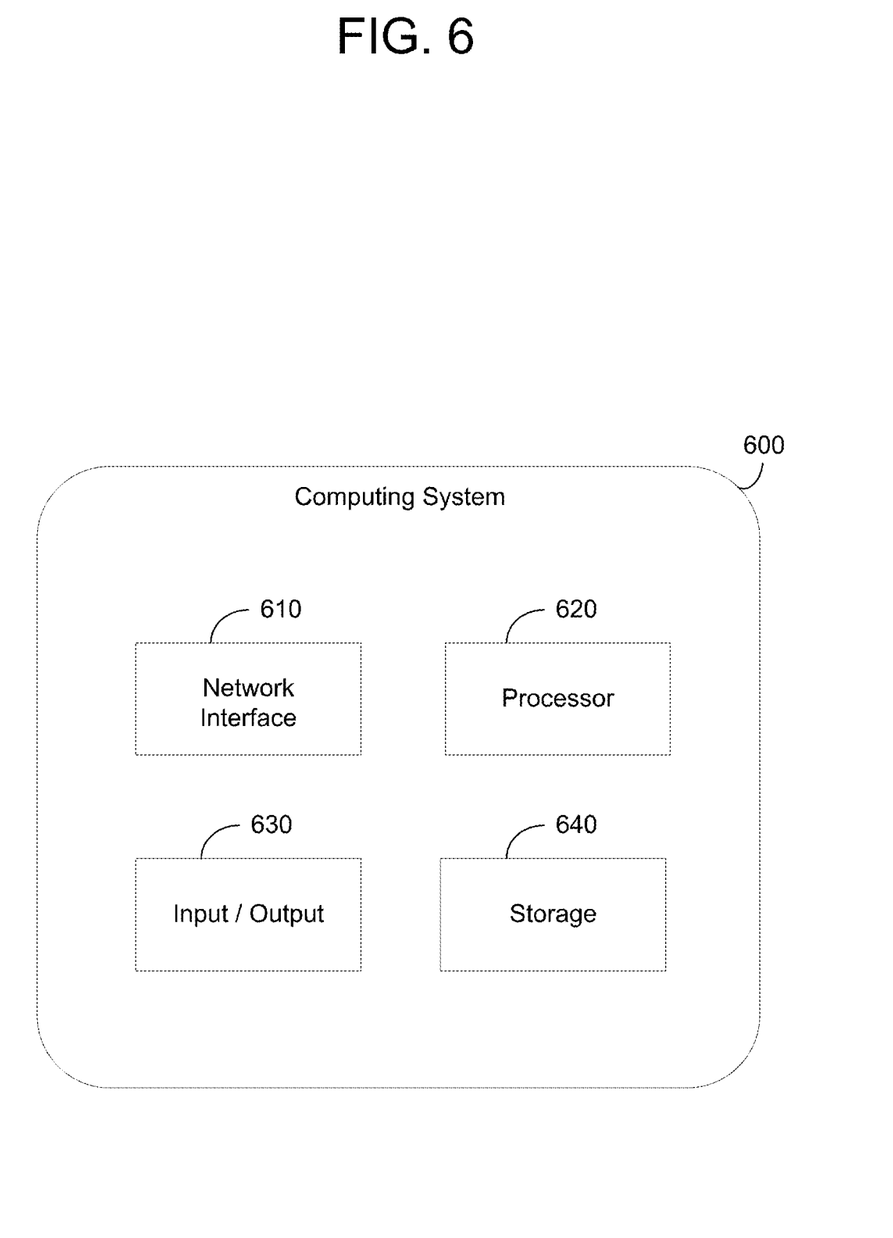
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage

640 may include a data store having a plurality of tables, partitions and sub-partitions. The storage 640 may be used to store database records, items, entries, and the like.

According to various embodiments, the processor 620 may receive a request to store a data object within a database. The request may be received from a process of the database which may be associated with an application, a user interface, a server, or the like. The processor 620 may determine a category type associated with the data object from among a plurality of category types based on an attribute of the data object. For example, the attribute may include a data type of the data such as MVCC, delta data, main data (index, dictionary, etc.), cache data, buffer data, and the like. The storage 640 may store the data object via a memory pool corresponding to the determined category from among a plurality of memory pools that correspond to the plurality of respective categories. Here, the storage 640 may include a main memory which has a number of memory pools therein. The processor 620 may allocate a first category type of data object to a first memory pool locked to main memory and allocate a second category type of data object to a second memory pool that is swapped out to disk over time.

For example, the processor 620 may determine the category type of the data object is the first category type in response to the data object comprising MVCC data, delta data, and the like. As another example, the processor 620 may determine the category type of the data object is the second category type in response to the data object comprising data from disk such as cache data, buffer data, dictionary data, index data, or the like. In some embodiments, the processor 620 may swap out a second data object from the second memory pool to the disk while keeping a third data object in the first memory pool that is older. As another example, when the second memory pool (or a third memory pool) is backed by an intermediate speed type of memory such as solid-state disk or NMVe, the processor 620 may swap out data from the second or third memory pools to the intermediate memory before swapping to disk which can help the performance of the database when retrieving data from the swapped out data. In these examples, the first memory pool may be pinned to physical memory and data in the second memory pool is managed with virtual memory that is backed by less physical memory than the first memory pool.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
   a main memory comprising a plurality of memory pools; and
   a processor configured to lock physical memory of a memory pool from among the plurality of memory pools to the main memory, receive a request to store a data object within the main memory, and determine that the data object comprises one or more of delta data from a delta storage of the main memory and multi-version concurrency control (MVCC) data of a database,
   where the processor is configured to allocate the data object to the locked memory pool that has been locked to the main memory in response to the determination that the data object comprise one or more of the delta data and the MVCC data.

2. The computing system of claim 1, wherein the processor is configured to determine the data object comprises MVCC data and assign the data object including the MVCC data to the locked memory pool.

3. The computing system of claim 1, wherein the processor is further configured to assign data objects from a differential buffer to the locked memory pool.

4. The computing system of claim 1, wherein the processor is configured to assign data retrieved from disk to a second memory pool that is swapped out to disk over time.

5. The computing system of claim 4, wherein the processor is further configured to swap out a second data object from the second memory pool to the disk while keeping a third data object in the locked memory pool that is older.

6. The computing system of claim 1, wherein the processor is configured to determine the data object comprises the delta data, and assign the data object including the delta data to the locked memory pool.

7. The computing system of claim 1, wherein the processor is further configured to allocate a category type of data object to a third memory pool which is swapped out to one or more of a non-volatile memory express (NVMe) and a solid-state disk (SSD).

8. The computing system of claim 1, wherein data in the locked memory pool is pinned to physical memory and data stored in a second memory pool that is not locked is managed with virtual memory that is backed by less physical memory than the locked memory pool.

9. A method comprising:
  locking a memory pool to main memory from among a plurality of memory pools included in the main memory;
  receiving a request to store a data object within the main memory;
  determining that the data object comprises one or more of delta data from a delta storage of the main memory and multiversion concurrency control (MVCC) data of a database; and
  allocating the data object to the locked memory pool that has been locked to the main memory in response to the determination that the data object comprise one or more of the delta data and the MVCC data.

10. The method of claim 9, wherein the determining comprises determining the data object comprises the MVCC data and assigning the data object including the MVCC data to the locked memory pool.

11. The method of claim 9, wherein the determining further comprises assigning data objects from a differential buffer to the locked memory pool.

12. The method of claim 9, wherein the determining further comprises assigning data retrieved from disk to a second memory pool that is swapped out to disk over time.

13. The method of claim 12, further comprising swapping out a second data object from the second memory pool to the disk while keeping a third data object in the locked memory pool that is older.

14. The method of claim 9, wherein the determining comprises determining the data object comprises the delta data, and assigning the data object including the delta data to the locked memory pool.

15. The method of claim 9, wherein the storing further comprises allocating a category type of data object to a third memory pool which is swapped out to one or more of a non-volatile memory express (NVMe) and a solid-state disk (SSD).

16. The method of claim 9, wherein data in the locked memory pool is pinned to physical memory and data in a second memory pool that is not locked is managed with virtual memory that is backed by less physical memory than the locked memory pool.

17. A non-transitory computer-readable medium storing instructions which when executed cause a computer to perform a method comprising:
  locking a memory pool to main memory from among a plurality of memory pools included in the main memory;
  receiving a request to store a data object within the main memory;
  determining that the data object comprises one or more of delta data from a delta storage of the main memory and multiversion concurrency control (MVCC) data of a database; and
  allocating the data object to the locked memory pool that has been locked to the main memory in response to the determination that the data object comprise one or more of the delta data and the MVCC data.

18. The non-transitory computer-readable medium of claim 17, wherein the determining comprises determining the data object comprises the MVCC data and assigning the data object including the MVCC data to the locked memory pool.

19. The non-transitory computer-readable medium of claim 17, wherein the determining comprises assigning data retrieved from disk to a second memory pool that is swapped out to disk over time.

20. The non-transitory computer-readable medium of claim 17, wherein the determining further comprises determining the data object comprises the delta data, and assigning the data object including the delta data to the locked memory pool.

* * * * *